United States Patent
Baek et al.

(10) Patent No.: US 9,579,599 B2
(45) Date of Patent: Feb. 28, 2017

(54) ENERGY-SAVING SYSTEM AND METHOD OF CAPTURING ACIDIC GAS BY USING SEPARATED WATER

(71) Applicant: KOREA INSTITUTE OF ENERGY RESEARCH, Daejeon (KR)

(72) Inventors: Il Hyun Baek, Daejeon (KR); Jong Kyun You, Daejeon (KR); Ki-Tae Park, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 15/030,559

(22) PCT Filed: Dec. 9, 2013

(86) PCT No.: PCT/KR2013/011324
§ 371 (c)(1),
(2) Date: Apr. 19, 2016

(87) PCT Pub. No.: WO2015/080324
PCT Pub. Date: Jun. 4, 2015

(65) Prior Publication Data
US 2016/0263518 A1 Sep. 15, 2016

(30) Foreign Application Priority Data
Nov. 27, 2013 (KR) .................. 10-2013-0145380

(51) Int. Cl.
*B01D 53/14* (2006.01)

(52) U.S. Cl.
CPC ..... *B01D 53/1425* (2013.01); *B01D 53/1475* (2013.01); *B01D 53/1456* (2013.01);
(Continued)

(58) Field of Classification Search
CPC ............ B01D 2259/65; B01D 53/1425; B01D 53/1456; C01B 2203/0415;
(Continued)

(56) References Cited

U.S. PATENT DOCUMENTS

2010/0229723 A1* 9/2010 Gelowitz ........... B01D 53/1425
95/162

FOREIGN PATENT DOCUMENTS

JP 2012-500713 A 1/2012
KR 10-2009-0008270 A 1/2009
(Continued)

OTHER PUBLICATIONS

International Search Report dated Aug. 18, 2014 of PCT/KR2013/011324 which is the parent application and its English translation—5 pages.
(Continued)

*Primary Examiner* — Duane Smith
*Assistant Examiner* — Cabrena Holecek
(74) *Attorney, Agent, or Firm* — Knobbe Martens Olson & Bear LLP (57) ABSTRACT

Provided is a system and method in which a heat amount to be supplied to a regeneration tower for regenerating an absorbent may be lowered in an acidic gas capturing system for capturing acidic gas such as carbon dioxide. According to the system and method of capturing acidic gas, heat generated in the system itself is used to reduce energy consumption. According to the system and method of the inventive concept, heat exchange is conducted between low-temperature separated water generated in a capturing process and high-temperature processing gas to thereby reduce a cooling capacity of a condenser when condensing the processing gas, and also, a reboiler heat duty may be lowered by introducing the low-temperature separated water
(Continued)

in a preheated state into the regeneration tower. In addition, the low-temperature separated water is used also in cooling a washing tower and a dilute solution through a heat integration process with respect to condensed water generated from the process itself, and thus, reduction of energy consumption of an absorbent regeneration process may be facilitated.

6 Claims, 6 Drawing Sheets

(52) U.S. Cl.
CPC ...... *B01D 53/1468* (2013.01); *B01D 2259/65* (2013.01); *Y02C 10/06* (2013.01)

(58) Field of Classification Search
CPC .... C01B 2203/0475; C01B 2203/0485; C01B 3/52; C10L 2290/541; C10L 3/102; Y02P 20/57

See application file for complete search history.

(56) References Cited

FOREIGN PATENT DOCUMENTS

| KR | 10-2010-0092967 A | 8/2010 |
|----|-------------------|--------|
| KR | 10-0983677 B1 | 9/2010 |
| KR | 10-2012-0029523 A | 3/2012 |
| KR | 10-2013-0023484 A | 3/2013 |

OTHER PUBLICATIONS

Park, "Carbon Dioxide Capture and Storage Technology", Physics and high technology, Jun. 2009, pp. 19-23.

\* cited by examiner

PRIOR ART

ENERGY-SAVING SYSTEM AND METHOD OF CAPTURING ACIDIC GAS BY USING SEPARATED WATER

TECHNICAL FIELD

The inventive concept relates to an acidic gas capturing system, and more particularly, to a system for reducing energy by circulating water separated by a water separator when capturing carbon dioxide.

BACKGROUND TECHNOLOGY

Use of fossil fuel increased the concentration of acidic gas such as carbon dioxide ($CO_2$), methane ($CH_4$), hydrogen sulfide ($H_2S$), carbonyl sulfide (COS) or the like in the atmosphere, which in turn resulted in global warming. In particular, various ways to reduce carbon dioxide in the atmosphere have been vigorously discussed worldwide since the Rio Summit in 1992.

Carbon Dioxide Capture& Storage (CCS) technology is a technique of separating, from the atmosphere, carbon dioxide discharged from power plants, steel factories, cement factories or the like that use fossil fuel and discharge a large amount of carbon dioxide.

Among the CCS technology, carbon dioxide capture technology is a core technology which takes up about 70% to 80% of total costs and includes a post-combustion technology, a pre-combustion technology, and an oxy-fuel combustion technology (Carbon Dioxide Capture& Storage Technology, Sangdo PARK, Physics and High End technology, June, 2009).

The post-combustion technology relates to removing $CO_2$ generated due to combustion of fossil fuel by allowing the $CO_2$ to be absorbed into or to react with various solvents. According to the pre-combustion technology, $CO_2$ is separated before combustion; that is, $CO_2$ is preprocessed by gasifying fossil fuel such as coal and converted into $CO_2$ and hydrogen ($H_2$), and then the $CO_2$ is separated from the mixture gas of $CO_2$ and $H_2$ or the mixture gas is burned so as to capture the $CO_2$ among the exhaust gas. According to the oxy-fuel combustion technology, instead of the air, only hydrogen is used in combustion of fossil fuel to thereby facilitate capturing of $CO_2$. Among the above-described technologies, the post-combustion technology is currently most widely used.

The post-combustion technology is the simplest way to apply to conventional sources of carbon dioxide. The technique relates to separating carbon dioxide through adsorption and desorption of carbon dioxide by using an absorbent, and is focused on improving performance of the absorbent and improving processes according to the improved performance of the absorbent. Examples of the technique that are commercialized and operated, and used to supply carbon dioxide required for the manufacture of urea fertilizer, for automobile welding, or for carbonated drinks are a wet absorption technique and a dry adsorption technique, and the wet absorption technique has a relatively high efficiency.

A main process of the wet absorption technique is a capturing process that uses an amine absorbent. The capturing process has technical reliability in that the process has been applied to a reforming process of a petrochemical process. However, for the process to be applied to flue gas containing various pollutants, performance of the absorbent and the process are to be improved. The process in which an amine absorbent is used is a chemical absorption process in which alkanolamine, which is a combination of an alkyl group with amine and hydroxyl, is used as an absorbent, and includes an absorption tower that selectively absorbs carbon dioxide from an influx gas, a regeneration tower (heating regeneration tower) regenerating the absorbent that has absorbed carbon dioxide, and other equipment.

MEA (Mono Ethanol Amine) which is most widely used as an amine absorbent provides the cause of acid-base neutralization reaction between an alkali property formed due to noncovalent electrons of an amine group, and carbon dioxide, which is acidic, in an aqueous solution, and the generated salt (carbamate or bicarbonate) is dissolved at about 110° C. to about 130° C. to be regenerated. Amines used as an absorbent exhibit many differences in terms of absorption power and speed depending on structural properties thereof.

While a process of absorbing carbon dioxide is performed at about 40° C. to about 50° C., a regeneration process is performed at about 110° C. to about 130° C., and thus, a portion of an absorbent is gasified during the regeneration process and is discharged with carbon dioxide. Thus, a cooler to cool and condense the portion of the absorbent and a preheating technique to lower a heat duty of a reboiler of the regeneration process are required.

Korean Patent Registration No. 0983677 discloses a system and method of absorbing and separating acidic gas, in detail, a method of using steam generated in a steam-generating boiler, as a heat source for regenerating an absorbent. However, this method has limitations in that steam is used only in regenerating the absorbent.

Thus, as a large amount of energy is consumed due to heating and cooling for the regeneration process, development of technology to reduce energy consumption is required.

PRIOR ART DOCUMENT

Patent Document (0001) Korean Patent Registration No. 0983677

Non-patent Document (0001) Carbon Dioxide Capture& Storage Technology, Sang-Do PARK, Physics and High Technology, June, 2009

DETAILED DESCRIPTION OF THE INVENTION

Technical Problem

The inventive concept provides an acidic gas capturing system and an acidic gas capturing method, in which separated water produced in the acidic gas capturing system is used in heat exchange of the acidic gas capturing system so as to reduce energy consumption.

Technical Solution

To achieve the objective, the inventors have completed the present inventive concept based on the findings that energy efficiency may be maximized by using separated water, which is separated as combustion exhaust gas passes a water separator before the exhaust gas is supplied to an absorption tower, in cooling or heating the exhaust gas, a washing tower, an absorbent solution, and a dilute solution.

According to an aspect of the inventive concept, there is provided an energy-saving acidic gas capturing system using separated water, the system including an absorption tower absorbing acidic gas by using an absorbent and a regeneration tower separating processing gas from the absorbent and including: an exhaust gas supply line through which an exhaust gas containing acidic gas is supplied to the absorption tower, wherein before the exhaust gas is injected into the absorption tower, the exhaust gas flows to the absorption tower after passing a first heat exchanger and a water separator; an absorbent supply line through which the absorbent that has absorbed acidic gas in the absorption tower is supplied to the regeneration tower, wherein the absorbent flows to the regeneration tower after passing a second heat exchanger; a processing gas line through which processing gas released from the regeneration tower is supplied to a condenser, wherein the processing gas passes a third heat exchanger before reaching the condenser; a condensed water supply line in which condensed water generated after passing the condenser is used; and a separated water supply line in which separated water separated using the water separator is used, wherein the separated water supply line includes: a supply line guiding the separated water to flow to a fourth heat exchanger so as to exchange heat with a dilute solution; a supply line guiding the separated water that has exchanged heat in the fourth heat exchanger, to flow to a fifth heat exchanger so as to collect heat of processing gas discharged from the regeneration tower; and a line through which the separated water that has passed the fifth heat exchanger is supplied to an upper portion of the regeneration tower.

According to another aspect of the inventive concept, there is provided an energy-saving acidic gas capturing system using separated water, the system including an absorption tower absorbing acidic gas by using an absorbent and a regeneration tower separating processing gas from the absorbent and including: an exhaust gas supply line through which an exhaust gas containing acidic gas is supplied to the absorption tower, wherein before the exhaust gas is injected into the absorption tower, the exhaust gas flows to the absorption tower after passing a first heat exchanger and a water separator; an absorbent supply line through which the absorbent that has absorbed acidic gas in the absorption tower is supplied to the regeneration tower, wherein the absorbent flows to the regeneration tower after passing a second heat exchanger; a processing gas line through which processing gas released from the regeneration tower is supplied to a condenser, wherein the processing gas passes a third heat exchanger before reaching the condenser; a condensed water supply line in which condensed water generated after passing the condenser is used; and a separated water supply line in which separated water separated using the water separator is used, wherein the separated water supply line includes: a supply line guiding the separated water to flow to a washing tower so that the separated water is used as cooling water of the washing tower; a supply line guiding the separated water that has exchanged heat in the washing tower, to flow to a fifth heat exchanger so as to collect heat of the processing gas discharged from the regeneration tower; and a line through which the separated water that has passed the fifth heat exchanger is supplied to an upper portion of the regeneration tower.

According to another aspect of the inventive concept, there is provided an energy-saving acidic gas capturing system using separated water, the system including an absorption tower absorbing acidic gas by using an absorbent and a regeneration tower separating processing gas from the absorbent and including: an exhaust gas supply line through which an exhaust gas containing acidic gas is supplied to the absorption tower, wherein before the exhaust gas is injected into the absorption tower, the exhaust gas flows to the absorption tower after passing a first heat exchanger and a water separator; an absorbent supply line through which the absorbent that has absorbed acidic gas in the absorption tower is supplied to the regeneration tower, wherein the absorbent flows to the regeneration tower after passing a second heat exchanger; a processing gas line through which processing gas released from the regeneration tower is supplied to a condenser, wherein the processing gas passes a third heat exchanger before reaching the condenser; a condensed water supply line in which condensed water generated after passing the condenser is used; and a separated water supply line in which separated water separated using the water separator is used, wherein the separated water supply line includes: a line in which condensed water generated after passing the condenser is combined with the separated water; a supply line guiding the combined separated water and condensed water to flow to a fourth heat exchanger so as to exchange heat with a dilute solution; a supply line guiding the separated water and the condensed water that have exchanged heat in the fourth heat exchanger, to flow to a fifth heat exchanger so as to collect heat of processing gas discharged from the regeneration tower; and a line through which the separated water that has passed the fifth heat exchanger is supplied to an upper portion of the regeneration tower.

According to another aspect of the inventive concept, there is provided an energy-saving acidic gas capturing system using separated water, the system including an absorption tower absorbing acidic gas by using an absorbent and a regeneration tower separating processing gas from the absorbent and including: an exhaust gas supply line through which an exhaust gas containing acidic gas is supplied to the absorption tower, wherein before the exhaust gas is injected into the absorption tower, the exhaust gas flows to the absorption tower after passing a first heat exchanger and a water separator; an absorbent supply line through which the absorbent that has absorbed acidic gas in the absorption tower is supplied to the regeneration tower, wherein the absorbent flows to the regeneration tower after passing a second heat exchanger; a processing gas line through which processing gas released from the regeneration tower is supplied to a condenser, wherein the processing gas passes a third heat exchanger before reaching the condenser; a condensed water supply line in which condensed water generated after passing the condenser is used; and a separated water supply line in which separated water separated using the water separator is used, wherein the separated water supply line includes: a line in which condensed water generated after passing the condenser is combined with the separated water; a supply line guiding the combined separated water and condensed water to pass a sixth heat exchanger so that the combined separated water and condensed water are used as cooling water of the exhaust gas; a supply line guiding the combined separated water and condensed water that have passed the sixth heat exchanger to flow to a fifth heat exchanger so as to collect heat of processing gas discharged from the regeneration tower; and a line through which the condensed water that has passed the fifth heat exchanger is supplied to an upper portion of the regeneration tower.

According to another aspect of the inventive concept, there is provided an energy-saving acidic gas capturing system using separated water, the system including an absorption tower absorbing acidic gas by using an absorbent and a regeneration tower separating processing gas from the absorbent and including: an exhaust gas supply line through which an exhaust gas containing acidic gas is supplied to the absorption tower, wherein before the exhaust gas is injected into the absorption tower, the exhaust gas flows to the absorption tower after passing a first heat exchanger and a water separator; an absorbent supply line through which the absorbent that has absorbed acidic gas in the absorption tower is supplied to the regeneration tower, wherein the absorbent flows to the regeneration tower after passing a second heat exchanger; a processing gas line through which processing gas released from the regeneration tower is supplied to a condenser, wherein the processing gas passes a third heat exchanger before reaching the condenser; a condensed water supply line in which condensed water generated after passing the condenser is used; and a separated water supply line in which separated water separated using the water separator is used, wherein the separated water supply line includes: a line through which the separated water is supplied to the first heat exchanger to cool combustion exhaust gas; and a line through which the separated water that has passed the first heat exchanger is directly supplied to an acidic gas absorption solution discharged from the absorption tower in order to collect heat of the acidic gas absorption solution.

An operating temperature of the condenser may be 30° C. to 40° C.

The acidic gas may be carbon dioxide ($CO_2$), methane ($CH_4$), hydrogen sulfide ($H_2S$), carbonyl sulfide (COS) or mercaptan (RSH, R=hydrocarbon).

According to another aspect of the inventive concept, there is provided an energy-saving acidic gas capturing method performed using separated water, the method being performed by using an absorption tower absorbing acidic gas by using an absorbent and a regeneration tower separating processing gas from the absorbent, and the method including: supplying an exhaust gas containing acidic gas to the absorption tower so that the absorbent absorbs acidic gas; supplying the absorbent that has absorbed the acidic gas and is released from the absorption tower, to the regeneration tower so as to separate the acidic gas from the absorbent; supplying processing gas released from the regeneration tower, to a condenser so as to separate condensed water from the processing gas; and supplying separated water to a separated water supply line where the separated water generated using the water separator is used, wherein the supplying of the separated water includes: collecting heat from a dilute solution by supplying the separated water to a fourth heat exchanger; collecting heat of the processing gas by supplying the separated water that has collected heat from the dilute solution, to a fifth heat exchanger; and supplying the separated water that has collected the heat of the processing gas to an upper portion of the regeneration tower.

According to another aspect of the inventive concept, there is provided an energy-saving acidic gas capturing method performed using separated water, the method being performed by using an absorption tower absorbing acidic gas by using an absorbent and a regeneration tower separating processing gas from the absorbent, and the method including: supplying an exhaust gas containing acidic gas to the absorption tower so that the absorbent absorbs acidic gas; supplying the absorbent that has absorbed the acidic gas and is released from the absorption tower, to the regeneration tower so as to separate the acidic gas from the absorbent; supplying processing gas released from the regeneration tower, to a condenser so as to separate condensed water from the processing gas; and supplying separated water to a separated water supply line where the separated water generated using the water separator is used, wherein the supplying of the separated water includes: supplying the separated water to a washing tower to cool the washing tower; collecting heat of the processing gas by supplying the separated water that has exchanged heat in the washing tower, to a fifth heat exchanger; and supplying the separated water that has collected the heat of the processing gas to an upper portion of the regeneration tower.

According to another aspect of the inventive concept, there is provided an energy-saving acidic gas capturing method performed using separated water, the method being performed by using an absorption tower absorbing acidic gas by using an absorbent and a regeneration tower separating processing gas from the absorbent, and the method including: supplying an exhaust gas containing acidic gas to the absorption tower so that the absorbent absorbs acidic gas; supplying the absorbent that has absorbed the acidic gas and is released from the absorption tower, to the regeneration tower so as to separate the acidic gas from the absorbent; supplying processing gas released from the regeneration tower, to a condenser so as to separate condensed water from the processing gas; and supplying separated water to a separated water supply line where the separated water generated using the water separator is used, wherein the supplying of the separated water includes: collecting heat from a dilute solution by supplying the separated water and the condensed water that is generated using the condenser to a fourth heat exchanger; collecting heat of the processing gas by supplying the separated water and the condensed water that have collected heat from the dilute solution, to a fifth heat exchanger; and supplying the separated water and the condensed water that have collected the heat of the processing gas to an upper portion of the regeneration tower.

According to another aspect of the inventive concept, there is provided an energy-saving acidic gas capturing method performed using separated water, the method being performed by using an absorption tower absorbing acidic gas by using an absorbent and a regeneration tower separating processing gas from the absorbent, and the method including: supplying an exhaust gas containing acidic gas to the absorption tower so that the absorbent absorbs acidic gas; supplying the absorbent that has absorbed the acidic gas and is released from the absorption tower, to the regeneration tower so as to separate the acidic gas from the absorbent; supplying processing gas released from the regeneration tower, to a condenser so as to separate condensed water from the processing gas; and supplying separated water to a separated water supply line where the separated water generated using the water separator is used, wherein the supplying of the separated water includes: cooling exhaust gas released from the absorption tower by supplying the separated water and the condensed water that is generated using the condenser, to a sixth heat exchanger; collecting heat of the processing gas by supplying the separated water and the condensed water that have collected heat from the exhaust gas, to a fifth heat exchanger; and supplying the separated water and the condensed water that have collected the heat of the processing gas to an upper portion of the regeneration tower.

According to another aspect of the inventive concept, there is provided an energy-saving acidic gas capturing method performed using separated water, the method being performed by using an absorption tower absorbing acidic gas by using an absorbent and a regeneration tower separating processing gas from the absorbent, and the method including: supplying an exhaust gas containing acidic gas to the absorption tower so that the absorbent absorbs acidic gas; supplying the absorbent that has absorbed the acidic gas and is released from the absorption tower, to the regeneration tower so as to separate the acidic gas from the absorbent; supplying processing gas released from the regeneration tower, to a condenser so as to separate condensed water from the processing gas; and supplying separated water to a separated water supply line where the separated water generated using the water separator is used, wherein the supplying of the separated water includes: cooling combustion exhaust gas by supplying the separated water to the first heat exchanger; and directly injecting the separated water that has collected heat of the exhaust gas, into an absorbent solution that has absorbed the acidic gas in the absorption tower.

An operating temperature of the condenser may be 30° C. to 40° C.

The acidic gas may be carbon dioxide ($CO_2$), methane ($CH_4$), hydrogen sulfide ($H_2S$), carbonyl sulfide (COS) or mercaptan (RSH, R=hydrocarbon).

Advantageous Effects of the Invention

According to the system and method of the inventive concept, low-temperature water, which is separated using a water separator, is allowed to exchange heat with high-temperature processing gas so as to preheat condensed water and then input the water to the regeneration tower, thereby lowering a reboiler heat duty. In addition, the separated low-temperature water is also used in cooling the washing tower and the dilute solution, thereby facilitating reduction of energy for an absorbent regeneration process.

EMBODIMENTS OF THE INVENTION

Hereinafter, a system and method of separating and collecting acidic gas according to the inventive concept will now be described with reference to the attached drawings.

Throughout the present specification and claims, the meaning of the terms used in the present specification and claims of the inventive concept should not be limited to be of ordinary or literary meaning. Accordingly, the features disclosed in the embodiments and drawings of the present specification are merely examples of embodiments of the inventive concept and do not represent the entire technical spirit of the inventive concept, and thus it should be understood that there are alternative equivalents or variation examples that can replace the embodiments at the point of the filing of the present application.

Throughout the drawings, elements having like functions are labeled like reference numerals, and repeated description thereof will be omitted. According to the inventive concept, lines, via which an absorbent, processing gas or condensed water used to exchange heat in a heat exchanger is transported, are described as "crossing" one another. That is, two fluid transport lines "cross" each other in a heat exchanger to exchange heat.

Figure 1:
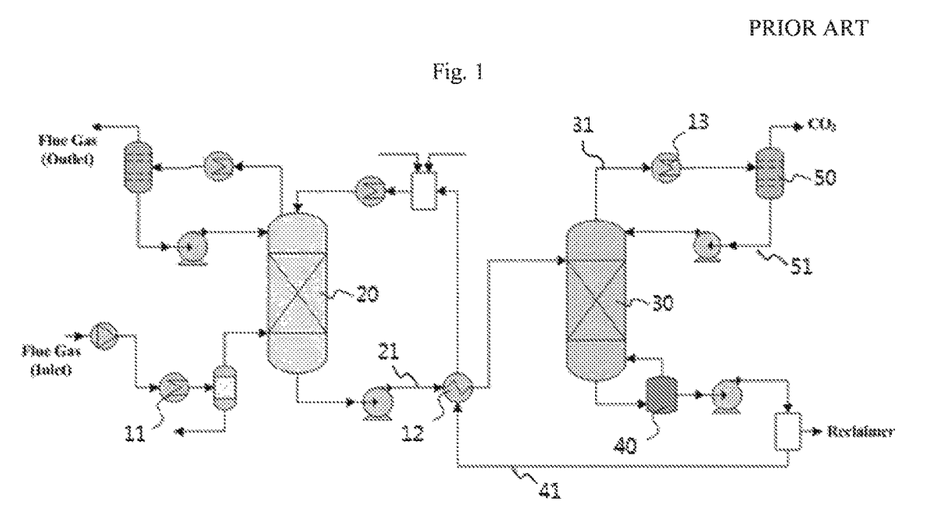
FIG. 1 illustrates a system for separating and collecting acidic gas according to the related art.

FIG. 1 illustrates an acidic gas capturing system according to the related art. An exhaust gas containing acidic gas such as carbon dioxide is supplied to an absorption tower 10 filled with a filling material having a broad surface area that allows easy contact between a gas and a liquid, thereby bringing the exhaust gas into contact with an absorbent which is in a solution form and is sprayed from an upper portion of the absorption tower under an atmospheric condition. The contact is made in a temperature range from about 40° C. to about 50° C. so that acidic gas in the exhaust gas such as carbon dioxide is absorbed into an absorption solution.

The absorbent released from the absorption tower, that is, the absorbent that has absorbed acidic gas including carbon dioxide is transmitted to a regeneration tower 20 and heated at a temperature of about 120° C., and processing gas that is removed from the absorbent is released to the upper portion of the regeneration tower, and the regenerated absorbent passes a reboiler 40 and then is resupplied into the absorption tower in a cyclic process. The processing gas released from the regeneration tower is supplied to a condenser 50 through a processing gas release line 31 so that water is condensed in the condenser and uncondensed steam and acidic gas such as carbon dioxide are obtained as a final product. The condensed water is recirculated into the regeneration tower through a condensed water supply line 51. While such recirculation increases a separation efficiency of the regeneration tower, a reboiler heat duty is increased as the condensed, low-temperature water is received. The regenerated absorbent moves along an absorbent recirculation line to preheat the absorbent that has absorbed the acidic gas transmitted to the regeneration tower, through a second heat exchanger 12, and is supplied again to the absorption tower in order to absorb new acidic gas. An absorbent supply line 41, through which the absorbent regenerated in the second heat exchanger is supplied, and an absorbent supply line 21, through which the absorbent that has absorbed the acidic gas in the absorption tower, cross each other.

Figure 2:
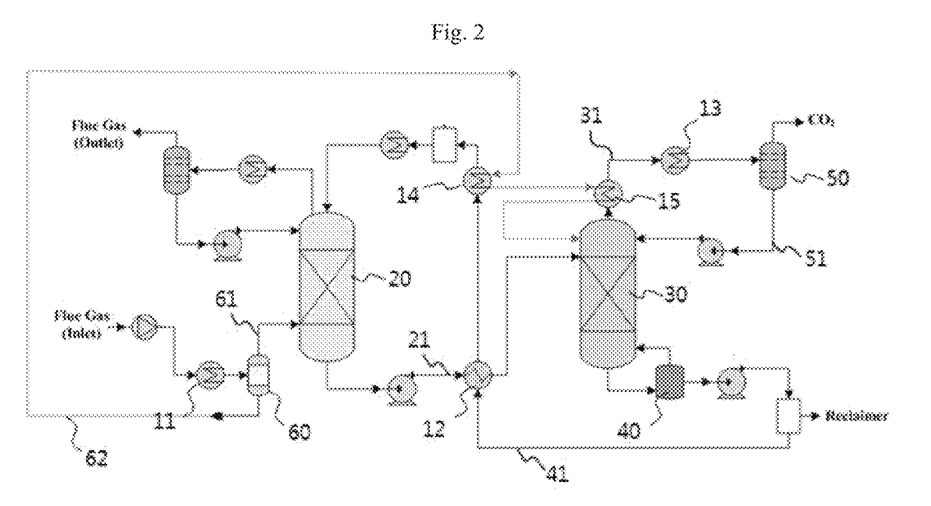
FIG. 2 illustrates an acidic gas capturing system according to an embodiment of the inventive concept.

FIG. 2 illustrates an acidic gas capturing system according to an embodiment of the inventive concept. The acidic gas capturing system includes an absorption tower 20 absorbing acidic gas by using an absorbent and a regeneration tower 30 separating processing gas from the absorbent, wherein the capturing system includes: an exhaust gas supply line 61 through which an exhaust gas containing acidic gas is supplied to the absorption tower, wherein before the exhaust gas is injected into the absorption tower, the exhaust gas flows to the absorption tower after passing a first heat exchanger 11 and a water separator 60; an absorbent supply line 21 through which the absorbent that has absorbed acidic gas in the absorption tower is supplied to the regeneration tower, wherein the absorbent flows to the regeneration tower after passing a second heat exchanger 12; a processing gas line through which processing gas released from the regeneration tower is supplied to a condenser 50, wherein the processing gas passes a third heat exchanger 13 before reaching the condenser; a condensed water supply line 51 in which condensed water generated after passing the condenser is used; and a separated water supply line 62 in which separated water separated using the water separator is used, wherein the separated water supply line comprises: a supply line guiding the separated water to flow to a fourth heat exchanger 14 so as to exchange heat with a dilute solution; a supply line guiding the separated water that has exchanged heat in the fourth heat exchanger, to flow to a fifth heat exchanger 15 so as to collect heat of processing gas discharged from the regeneration tower; and a supply line through which the separated water that has passed the fifth heat exchanger is supplied to an upper portion of the regeneration tower.

The dilute solution refers to an amine solution (absorbent) obtained as the absorbent that has absorbed acidic gas from the acidic gas capturing system is supplied to the regeneration tower, and the acidic gas is removed in the regeneration tower. The regenerated absorbent passes the reboiler 40 to be supplied to the absorption tower in order to absorb acidic gas again. According to the inventive concept, the separated water is supplied to the separated water supply line and used as cooling water. The separated water is separated using a water separator before injecting combustion exhaust gas into the absorption tower, and is used as cooling water to cool dilute solution through heat exchange in the fourth heat exchanger. The separated water that has collected heat of the dilute solution is supplied to the fifth heat exchanger to collect heat of processing gas of a high temperature (90° C. to 100° C.) generated in the regeneration tower, and then injected into the upper portion of the regeneration tower. If condensed cold water is input to the regeneration tower as in the related art, a reboiler heat duty of the reboiler is increased. Thus, according to the acidic gas capturing system operation illustrated in FIG. 2, heat is collected from the dilute solution and the processing gas to preheat separated water, and the preheated separated water is injected with the condensed cold water, and thus, the effect of lowering the reboiler heat duty may be obtained. In addition, by cooling the processing gas, a cooling load of the condenser located above the regeneration tower may be lowered.

According to an embodiment of the inventive concept, an operating temperature of the condenser is 30° C. to 40° C. In addition, carbon dioxide ($CO_2$), methane ($CH_4$), hydrogen sulfide ($H_2S$), carbonyl sulfide (COS) or mercaptan (RSH, R=hydrocarbon) or the like may be selected as the acidic gas, but the acidic gas is not limited thereto.

Figure 3:
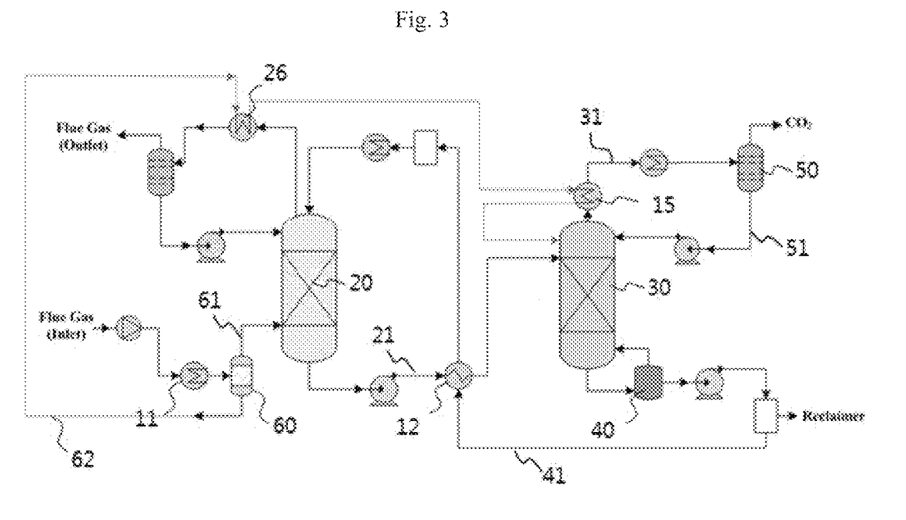
FIG. 3 illustrates an acidic gas capturing system according to another embodiment of the inventive concept.

FIG. 3 illustrates an acidic gas capturing system according to another embodiment of the inventive concept. The acidic gas capturing system includes an absorption tower 20 absorbing acidic gas by using an absorbent and a regeneration tower 30 separating processing gas from the absorbent, wherein the capturing system includes: an exhaust gas supply line 61 through which an exhaust gas containing acidic gas is supplied to the absorption tower, wherein before the exhaust gas is injected into the absorption tower, the exhaust gas flows to the absorption tower after passing a first heat exchanger 11 and a water separator 60; an absorbent supply line 21 through which the absorbent that has absorbed acidic gas in the absorption tower is supplied to the regeneration tower, wherein the absorbent flows to the regeneration tower after passing a second heat exchanger 12; a processing gas line through which processing gas released from the regeneration tower is supplied to a condenser 50, wherein the processing gas passes a third heat exchanger 13 before reaching the condenser; a condensed water supply line 51 in which condensed water generated after passing the condenser is used; and a separated water supply line 62 in which separated water separated using the water separator is used, wherein the separated water supply line comprises: a supply line guiding the separated water to flow to a washing tower 26 so that the separated water is used as cooling water of the washing tower; a supply line guiding the separated water that has exchanged heat in the washing tower, to flow to a fifth heat exchanger 15 so as to collect heat of the processing gas discharged from the regeneration tower; and a supply line through which the separated water that has passed the fifth heat exchanger is supplied to an upper portion of the regeneration tower.

When water washing for collecting amine is included above the absorption tower, cooling of exhaust gas is to be preceded in order to wash off impurities from the exhaust gas released from the absorption tower. Accordingly, the separated water may be used as cooling water of the washing tower in order to cool the exhaust has released from the absorption tower. The separated water used as cooling water for the washing tower is supplied to the fifth heat exchanger to collect heat through heat exchange with processing gas generated in the regeneration tower, and then is injected to the upper portion of the regeneration tower. If condensed cold water is input to the regeneration tower as in the related art, a reboiler heat duty of the reboiler is increased. Thus, according to the acidic gas capturing system operation illustrated in FIG. 3, heat is collected from the dilute solution and the processing gas to preheat separated water, and the preheated separated water is injected with the condensed cold water, and thus, the effect of lowering the reboiler heat duty may be obtained. In addition, by cooling the processing gas, a cooling load of the condenser located above the regeneration tower may be lowered.

According to an embodiment of the inventive concept, an operating temperature of the condenser is 30° C. to 40° C. In addition, carbon dioxide ($CO_2$), methane ($CH_4$), hydrogen sulfide ($H_2S$), carbonyl sulfide (COS) or mercaptan (RSH, R=hydrocarbon) or the like may be as the acidic gas, but the acidic gas is not limited thereto.

Figure 4:
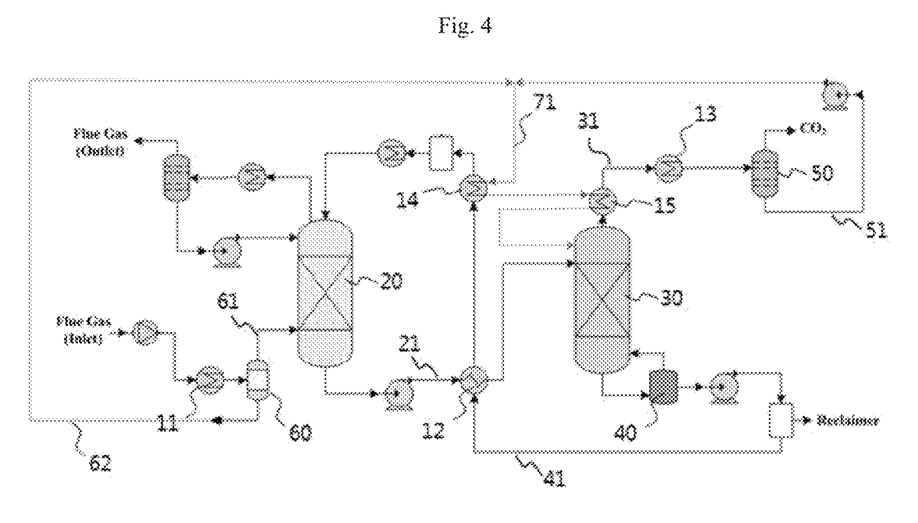
FIG. 4 illustrates an acidic gas capturing system according to another embodiment of the inventive concept.

FIG. 4 illustrates an acidic gas capturing system according to another embodiment of the inventive concept. The acidic gas capturing system includes an absorption tower 20 absorbing acidic gas by using an absorbent and a regeneration tower 30 separating processing gas from the absorbent, wherein the capturing system includes: an exhaust gas supply line 61 through which an exhaust gas containing acidic gas is supplied to the absorption tower, wherein before the exhaust gas is injected into the absorption tower, the exhaust gas flows to the absorption tower after passing a first heat exchanger 11 and a water separator 60; an absorbent supply line 21 through which the absorbent that has absorbed acidic gas in the absorption tower is supplied to the regeneration tower, wherein the absorbent flows to the regeneration tower after passing a second heat exchanger 12; a processing gas line through which processing gas released from the regeneration tower is supplied to a condenser 50, wherein the processing gas passes a third heat exchanger 13 before reaching the condenser; a condensed water supply line 51 in which condensed water generated after passing the condenser is used; and a separated water supply line 62 in which separated water separated using the water separator is used, wherein the separated water supply line comprises: a line 71 in which condensed water generated after passing the condenser is combined with the separated water; a supply line guiding the combined separated water and condensed water to flow to a fourth heat exchanger 14 so as to exchange heat with a dilute solution; a supply line guiding the separated water and the condensed water that have exchanged heat in the fourth heat exchanger, to flow to a fifth heat exchanger 15 so as to collect heat of processing gas discharged from the regeneration tower; and a line through which the separated water that has passed the fifth heat exchanger is supplied to an upper portion of the regeneration tower.

According to the system of FIG. 4, by using a heat integration process by using both separated water and condensed water, the separated water generated using the water separator and the condensed water generated using the condenser are combined with each other through the separated water supply line and the condensed water supply line, respectively. Then the combined separated water and condensed water are supplied to the fourth heat exchanger and used at the same time as cooling water for the dilute solution. The combined separated water and the condensed water that have collected heat of the dilute solution are supplied to the fifth heat exchanger to collect heat of processing gas of a high temperature (90° C. to 100° C.) generated in the regeneration tower, and then injected into the upper portion of the regeneration tower. If condensed cold water is input to the regeneration tower as in the related art, a reboiler heat duty of the reboiler 40 is increased. Thus, according to the acidic gas capturing system operation illustrated in FIG. 4, heat is collected from the dilute solution and the processing gas to preheat the separated water and the condensed water, and the preheated separated water and condensed water are injected together, and thus, the effect of lowering the reboiler heat duty may be obtained. In addition, by cooling the processing gas, a cooling load of the condenser located above the regeneration tower may be lowered.

According to an embodiment of the inventive concept, an operating temperature of the condenser is 30° C. to 40° C. In addition, carbon dioxide ($CO_2$), methane ($CH_4$), hydrogen sulfide ($H_2S$), carbonyl sulfide (COS) or mercaptan (RSH, R=hydrocarbon) or the like may be as the acidic gas, but the acidic gas is not limited thereto.

Figure 5:
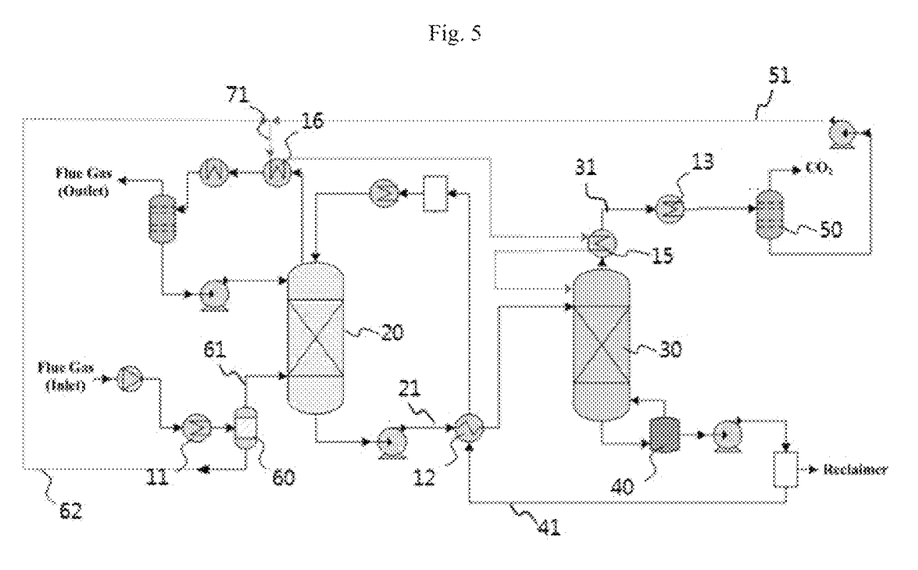
FIG. 5 illustrates an acidic gas capturing system according to another embodiment of the inventive concept.

FIG. 5 illustrates an acidic gas capturing system according to another embodiment of the inventive concept. The acidic gas capturing system includes an absorption tower 20 absorbing acidic gas by using an absorbent and a regeneration tower 30 separating processing gas from the absorbent, wherein the capturing system includes: an exhaust gas supply line 61 through which an exhaust gas containing acidic gas is supplied to the absorption tower, wherein before the exhaust gas is injected into the absorption tower, the exhaust gas flows to the absorption tower after passing a first heat exchanger 11 and a water separator 60; an absorbent supply line 21 through which the absorbent that has absorbed acidic gas in the absorption tower is supplied to the regeneration tower, wherein the absorbent flows to the regeneration tower after passing a second heat exchanger 12; a processing gas line through which processing gas released from the regeneration tower is supplied to a condenser 50, wherein the processing gas passes a third heat exchanger 13 before reaching the condenser; a condensed water supply line 51 in which condensed water generated after passing the condenser is used; and a separated water supply line 62 in which separated water separated using the water separator is used, wherein the separated water supply line comprises: a line 71 in which condensed water generated after passing the condenser is combined with the separated water; a supply line guiding the combined separated water and condensed water to pass a sixth heat exchanger 16 so that the combined separated water and condensed water are used as cooling water of the exhaust gas; a supply line guiding the combined separated water and condensed water that have passed the sixth heat exchanger to flow to a fifth heat exchanger 15 so as to collect heat of processing gas discharged from the regeneration tower; and a line through which the condensed water that has passed the fifth heat exchanger is supplied to an upper portion of the regeneration tower.

According to the system of FIG. 5, through a heat integration process in which separated water and condensed water are used at the same time, separated water and condensed water are supplied to the sixth heat exchanger through the separated water supply line and the condensed water supplied line, respectively, and the separated water and the condensed water are used as cooling water for the exhaust gas released from the absorption tower at the same time. The separated water and the condensed water that have collected heat of the dilute solution are supplied to the fifth heat exchanger to collect heat of processing gas of a high temperature (90° C. to 100° C.) generated in the regeneration tower, and then are injected into the upper portion of the regeneration tower. When condensed cold water is input to the regeneration tower as in the related art, a reboiler heat duty of the reboiler is increased. According to the acidic gas capturing system operation illustrated in FIG. 5, heat is collected from the dilute solution and the processing gas to preheat the separated water and the condensed water, and the preheated separated water and condensed water are injected together, and thus, the effect of lowering the reboiler heat duty may be obtained. In addition, by cooling the processing gas, a cooling load of the condenser located above the regeneration tower may be lowered.

According to an embodiment of the inventive concept, an operating temperature of the condenser is 30° C. to 40° C. In addition, carbon dioxide ($CO_2$), methane ($CH_4$), hydrogen sulfide ($H_2S$), carbonyl sulfide (COS) or mercaptan (RSH, R=hydrocarbon) or the like may be as the acidic gas, but the acidic gas is not limited thereto.

Figure 6:
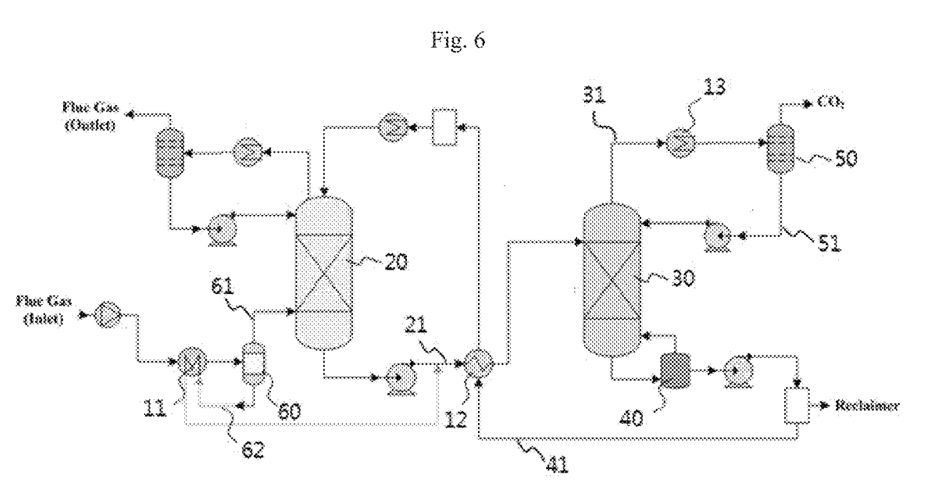
FIG. 6 illustrates an acidic gas capturing system according to another embodiment of the inventive concept.

FIG. 6 illustrates an acidic gas capturing system according to another embodiment of the inventive concept. The acidic gas capturing system includes an absorption tower 20 absorbing acidic gas by using an absorbent and a regeneration tower 30 separating processing gas from the absorbent, wherein the capturing system includes: an exhaust gas supply line 61 through which an exhaust gas containing acidic gas is supplied to the absorption tower, wherein before the exhaust gas is injected into the absorption tower, the exhaust gas flows to the absorption tower after passing a first heat exchanger 11 and a water separator 60; an absorbent supply line 21 through which the absorbent that has absorbed acidic gas in the absorption tower is supplied to the regeneration tower, wherein the absorbent flows to the regeneration tower after passing a second heat exchanger 12; a processing gas line through which processing gas released from the regeneration tower is supplied to a condenser 50, wherein the processing gas passes a third heat exchanger 13 before reaching the condenser; a condensed water supply line 51 in which condensed water generated after passing the condenser is used; and a separated water supply line 62 in which separated water separated using the water separator is used, wherein the separated water supply line comprises: a line through which the separated water is supplied to the first heat exchanger 11 to cool combustion exhaust gas; and a line through which the separated water that has passed the first heat exchanger is directly supplied to an acidic gas absorption solution discharged from the absorption tower in order to collect heat of the acidic gas absorption solution.

The acidic gas supplied through the exhaust gas supply line may be cooled by supplying the separated water to the first heat exchanger, and the separated water that has collected heat from the acidic gas is directly injected into an absorbent solution that has absorbed acidic gas released from the absorption tower. The absorbent solution that is preheated by the separated water crosses with the dilute solution (100° C. to 120° C.) regenerated in the second heat exchanger to be preheated to a high temperature (100° C.), and then injected into the regeneration tower.

According to an embodiment of the inventive concept, an operating temperature of the condenser is 30° C. to 40° C. In addition, carbon dioxide ($CO_2$), methane ($CH_4$), hydrogen sulfide ($H_2S$), carbonyl sulfide (COS) or mercaptan (RSH, R=hydrocarbon) or the like may be as the acidic gas, but the acidic gas is not limited thereto.

In an embodiment of the inventive concept, an acidic gas capturing method performed using an absorption tower absorbing acidic gas by using an absorbent and a regeneration tower separating processing gas from the absorbent includes: supplying an exhaust gas containing acidic gas to the absorption tower so that the absorbent absorbs acidic gas; supplying the absorbent that has absorbed the acidic gas and is released from the absorption tower, to the regeneration tower so as to separate the acidic gas from the absorbent; supplying processing gas released from the regeneration tower, to a condenser so as to separate condensed water from the processing gas; and supplying separated water to a separated water supply line where the separated water generated using the water separator is used, wherein the supplying of the separated water comprises: collecting heat from a dilute solution by supplying the separated water to a fourth heat exchanger; collecting heat of the processing gas by supplying the separated water that has collected heat from the dilute solution, to a fifth heat exchanger; and supplying the separated water that has collected the heat of the processing gas to an upper portion of the regeneration tower.

In another embodiment of the inventive concept, an acidic gas capturing method performed using an absorption tower absorbing acidic gas by using an absorbent and a regeneration tower separating processing gas from the absorbent includes: supplying an exhaust gas containing acidic gas to the absorption tower so that the absorbent absorbs acidic gas; supplying the absorbent that has absorbed the acidic gas and is released from the absorption tower, to the regeneration tower so as to separate the acidic gas from the absorbent; supplying processing gas released from the regeneration tower, to a condenser so as to separate condensed water from the processing gas; and supplying separated water to a separated water supply line where the separated water generated using the water separator is used, wherein the supplying of the separated water comprises: supplying the separated water to a washing tower to cool the washing tower; collecting heat of the processing gas by supplying the separated water that has exchanged heat in the washing tower, to a fifth heat exchanger; and supplying the separated water that has collected the heat of the processing gas to an upper portion of the regeneration tower.

In another embodiment of the inventive concept, an energy-saving acidic gas capturing method performed using an absorption tower absorbing acidic gas by using an absorbent and a regeneration tower separating processing gas from the absorbent includes: supplying an exhaust gas containing acidic gas to the absorption tower so that the absorbent absorbs acidic gas; supplying the absorbent that has absorbed the acidic gas and is released from the absorption tower, to the regeneration tower so as to separate the acidic gas from the absorbent; supplying processing gas released from the regeneration tower, to a condenser so as to separate condensed water from the processing gas; and supplying separated water to a separated water supply line where the separated water generated using the water separator is used, wherein the supplying of the separated water comprises: collecting heat from a dilute solution by supplying the separated water and the condensed water that is generated using the condenser to a fourth heat exchanger; collecting heat of the processing gas by supplying the separated water and the condensed water that have collected heat from the dilute solution, to a fifth heat exchanger; and supplying the separated water and the condensed water that have collected the heat of the processing gas to an upper portion of the regeneration tower.

In another embodiment of the inventive concept, an energy-saving acidic gas capturing method performed using an absorption tower absorbing acidic gas by using an absorbent and a regeneration tower separating processing gas from the absorbent includes: supplying an exhaust gas containing acidic gas to the absorption tower so that the absorbent absorbs acidic gas; supplying the absorbent that has absorbed the acidic gas and is released from the absorption tower, to the regeneration tower so as to separate the acidic gas from the absorbent; supplying processing gas released from the regeneration tower, to a condenser so as to separate condensed water from the processing gas; and supplying separated water to a separated water supply line where the separated water generated using the water separator is used, wherein the supplying of the separated water comprises: cooling exhaust gas released from the absorption tower by supplying the separated water and the condensed water that is generated using the condenser, to a sixth heat exchanger; collecting heat of the processing gas by supplying the separated water and the condensed water that have collected heat from the exhaust gas, to a fifth heat exchanger; and supplying the separated water and the condensed water that have collected the heat of the processing gas to an upper portion of the regeneration tower.

In another embodiment of the inventive concept, an energy-saving acidic gas capturing method performed using an absorption tower absorbing acidic gas by using an absorbent and a regeneration tower separating processing gas from the absorbent includes: supplying an exhaust gas containing acidic gas to the absorption tower so that the absorbent absorbs acidic gas; supplying the absorbent that has absorbed the acidic gas and is released from the absorption tower, to the regeneration tower so as to separate the acidic gas from the absorbent; supplying processing gas released from the regeneration tower, to a condenser so as to separate condensed water from the processing gas; and supplying separated water to a separated water supply line where the separated water generated using the water separator is used, wherein the supplying of the separated water comprises: cooling combustion exhaust gas by supplying the separated water to the first heat exchanger; and directly injecting the separated water that has collected heat of the exhaust gas, into an absorbent solution that has absorbed the acidic gas in the absorption tower.

While the inventive concept has been particularly shown and described with reference to embodiments thereof, the scope of the inventive concept is not limited thereto, and all various modifications and differences made by one of ordinary skill in the art without departing from the spirit and scope of the inventive concept as defined by the following claims will be construed as being included in the inventive concept.

Unless defined differently, all terms used in the description including technical and scientific terms have the same meanings as generally understood by those skilled in the art.

Details of all publications listed as reference documents in the present specification are incorporated into the inventive concept.

The invention claimed is:

1. An energy-saving acidic gas capturing system using separated water, the system comprising an absorption tower absorbing acidic gas by using an absorbent and a regeneration tower separating processing gas from the absorbent and comprising:
   an exhaust gas supply line through which an exhaust gas containing acidic gas is supplied to the absorption tower, wherein before the exhaust gas is injected into the absorption tower, the exhaust gas flows to the absorption tower after passing a first heat exchanger and a water separator;
   an absorbent supply line through which the absorbent that has absorbed acidic gas in the absorption tower is supplied to the regeneration tower, wherein the absorbent flows to the regeneration tower after passing a second heat exchanger;
   a processing gas line through which processing gas released from the regeneration tower is supplied to a condenser, wherein the processing gas passes a third heat exchanger before reaching the condenser;
   a condensed water supply line in which condensed water generated after passing the condenser is used; and
   a separated water supply line in which separated water separated using the water separator is used,
   wherein the separated water supply line comprises any one of (a), (b), (c), (d) or (e):
   (a) a supply line guiding the separated water to flow to a fourth heat exchanger so as to exchange heat with a dilute solution; a supply line guiding the separated water that has exchanged heat in the fourth heat exchanger, to flow to a fifth heat exchanger so as to collect heat of processing gas discharged from the regeneration tower; and a line through which the separated water that has passed the fifth heat exchanger is supplied to an upper portion of the regeneration tower;
   (b) a supply line guiding the separated water to flow to a washing tower so that the separated water is used as cooling water of the washing tower; a supply line guiding the separated water that has exchanged heat in the washing tower, to flow to the fifth heat exchanger so as to collect heat of the processing gas discharged from the regeneration tower; and a line through which the separated water that has passed the fifth heat exchanger is supplied to the upper portion of the regeneration tower;
   (c) a line in which condensed water generated after passing the condenser is combined with the separated water; a supply line guiding the combined separated water and condensed water to flow to the fourth heat exchanger so as to exchange heat with a dilute solution; a supply line guiding the separated water and the condensed water that have exchanged heat in the fourth heat exchanger, to flow to the fifth heat exchanger so as to collect heat of processing gas dischared from the regeneration tower; and a line through which the separated water that has passed the fifth heat exchanger is supplied to the upper portion of the regeneration tower;
   (d) a line in which condensed water generated after passing the condenser is combined with the separated water; a supply line guiding the combined separated water and condensed water to pass a sixth heat exchanger so that the combined separated water and condensed water are used as cooling water of the exhaust gas; a supply line guiding the combined separated water and condensed water that have passed the sixth heat exchanger to flow to the fifth heat exchanger so as to collect heat of processing gas discharged from the regeneration tower; and a line through which the condensed water that has passed the fifth heat exchanger is supplied to the upper portion of the regeneration tower; or
   (e) a line through which the separated water is supplied to the first heat exchanger to cool combustion exhaust gas; and a line through which the separated water that has passed the first heat exchanger is directly supplied to an acidic gas absorption solution discharged from the absorption tower in order to collect heat of the acidic gas absorption solution.

2. The energy-saving acidic gas capturing system using separated water of claim 1, wherein an operating temperature of the condenser is 30° C. to 40° C.

3. The energy-saving acidic gas capturing system using separated water of claim 1, wherein the acidic gas is carbon dioxide ($CO_2$), methane ($CH_4$), hydrogen sulfide ($H_2S$), carbonyl sulfide (COS) or mercaptan (RSH, R=hydrocarbon).

4. An energy-saving acidic gas capturing method performed using separated water, the method being performed by using an absorption tower absorbing acidic gas by using an absorbent and a regeneration tower separating processing gas from the absorbent, and the method comprising:
   supplying an exhaust gas containing acidic gas to the absorption tower so that the absorbent absorbs acidic gas;
   supplying the absorbent that has absorbed the acidic gas and is released from the absorption tower, to the regeneration tower so as to separate the acidic gas from the absorbent;
   supplying processing gas released from the regeneration tower, to a condenser so as to separate condensed water from the processing gas; and
   supplying separated water to a separated water supply line where the separated water generated using a water separator is used,
   wherein the supplying of the separated water comprises any one of (a), (b), (c), (d) or (e):
   (a) collecting heat from a dilute solution by supplying the separated water to a fourth heat exchanger; collecting heat of the processing gas by supplying the separated water that has collected heat from the dilute solution, to a fifth heat exchanger; and supplying the separated water that has collected the heat of the processing gas to an upper portion of the regeneration tower;
   (b) supplying the separated water to a washing tower to cool the washing tower; collecting heat of the processing gas by supplying the separated water that has exchanged heat in the washing tower, to the fifth heat exchanger; and supplying the separated water that has collected the heat of the processing gas to the upper portion of the regeneration tower;
   (c) collecting heat from a dilute solution by supplying the separated water and the condensed water that is generated using the condenser to the fourth heat exchanger; collecting heat of the processing gas by supplying the separated water and the condensed water that have collected heat from the dilute solution, to the fifth heat exchanger; and supplying the separated water and the condensed water that have collected the heat of the processing gas to the upper portion of the regeneration tower;

(d) cooling exhaust gas released from the absorption tower by supplying the separated water and the condensed water that is generated using the condenser, to a sixth heat exchanger; collecting heat of the processing gas by supplying the separated water and the condensed water that have collected heat from the exhaust gas, to the fifth heat exchanger; and supplying the separated water and the condensed water that have collected the heat of the processing gas to the upper portion of the regeneration tower; and (e) cooling combustion exhaust gas by supplying the separated water to a first heat exchanger; and directly injecting the separated water that has collected heat of the exhaust gas, into an absorbent solution that has absorbed the acidic gas in the absorption tower.

5. The energy-saving acidic gas capturing system by using separated water of claim 4, wherein an operating temperature of the condenser is 30° C. to 40° C.

6. The energy-saving acidic gas capturing system by using separated water of one of claim 4, wherein the acidic gas is carbon dioxide ($CO_2$), methane ($CH_4$), hydrogen sulfide ($H_2S$), carbonyl sulfide (COS) or mercaptan (RSH, R=hydrocarbon).

* * * * *